United States Patent
Feng et al.

(10) Patent No.: US 10,962,937 B2
(45) Date of Patent: Mar. 30, 2021

(54) POWER CONSUMPTION MANAGEMENT METHOD FOR ELECTRIC DEVICES, MANAGER AND MANAGEMENT SYSTEM

(71) Applicant: Gree Electric Appliances, Inc. of Zhuhai, Guangdong (CN)

(72) Inventors: Zhonghang Feng, Guangdong (CN); Lingjun Wang, Guangdong (CN); Xiao Luo, Guangdong (CN); Shizhuo Shao, Guangdong (CN); Zhiwei Zhang, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 0 days.

(21) Appl. No.: 16/326,816

(22) PCT Filed: Apr. 18, 2017

(86) PCT No.: PCT/CN2017/080867
§ 371 (c)(1),
(2) Date: Feb. 20, 2019

(87) PCT Pub. No.: WO2018/072412
PCT Pub. Date: Apr. 26, 2018

(65) Prior Publication Data
US 2019/0235450 A1    Aug. 1, 2019

(30) Foreign Application Priority Data

Oct. 21, 2016 (CN) .......................... 201610917629.1

(51) Int. Cl.
G05B 13/02    (2006.01)
G05B 19/04    (2006.01)
G05B 15/02    (2006.01)

(52) U.S. Cl.
CPC ........... *G05B 13/021* (2013.01); *G05B 15/02* (2013.01); *G05B 19/04* (2013.01); *G05B 2219/2639* (2013.01); *G05B 2219/2642* (2013.01)

(58) Field of Classification Search
CPC ...... G05B 13/021; G05B 15/02; G05B 19/04; G05B 2219/2639; G05B 2219/2642; G05B 19/042
See application file for complete search history.

(56) References Cited

U.S. PATENT DOCUMENTS 6,909,921 B1 * 6/2005 Bilger ................ G08B 21/0484
                                                            700/19
7,165,864 B2    1/2007 Miller
(Continued)

FOREIGN PATENT DOCUMENTS

CN    101546177 A    9/2009
CN    202110399      1/2012
(Continued)

OTHER PUBLICATIONS

International Search Report, dated Aug. 8, 2017, in International application No. PCT/CN2017/080667, filed on Apr. 18, 2017. 6 Pages.
(Continued)

*Primary Examiner* — Christopher E. Everett
(74) *Attorney, Agent, or Firm* — McAndrews, Held & Malloy, Ltd.

(57) ABSTRACT

Disclosed are a power consumption management method for electric devices, a manager and a management system. The power consumption management method may include: acquiring identification information of an electric device in a power-on state in a monitoring area (S101); collecting information of the monitoring area, and determining whether a user exists in the monitoring area or not according
(Continued)

to a collection result (S102); when the user does not exist in the monitoring area, determining a type set to which the identification information belongs (S103); when determining that the identification information is comprised in a first type set, powering off the electric device (S104); and when determining that the identification information is comprised in a second type set, beginning timekeeping, and when a timekeeping duration reaches to a preset duration matched with the identification information, powering off the electric device (S105). Therefore, the energy waste due to the fact that a user forgets to turn off an electric device when leaving the monitoring area may be prevented.

15 Claims, 3 Drawing Sheets

(56) References Cited

U.S. PATENT DOCUMENTS

| | | | |
|---|---|---|---|
| 8,639,391 B1 | 1/2014 | Alberth, Jr. et al. | |
| 2004/0133314 A1* | 7/2004 | Ehlers | G06Q 40/06 700/276 |
| 2004/0163705 A1* | 8/2004 | Uhler | F17D 5/06 137/79 |
| 2007/0155349 A1* | 7/2007 | Nelson | H02J 13/0013 455/128 |
| 2008/0267015 A1 | 10/2008 | Zhang et al. | |
| 2010/0188229 A1* | 7/2010 | Nhep | F24C 7/08 340/573.1 |
| 2010/0262297 A1* | 10/2010 | Shloush | H05B 47/175 700/276 |
| 2011/0313582 A1* | 12/2011 | van Megen | G01D 4/00 700/292 |
| 2012/0296487 A1* | 11/2012 | Leinen | F24F 11/30 700/296 |
| 2013/0030732 A1* | 1/2013 | Shetty | G01R 21/133 702/62 |
| 2013/0184892 A1* | 7/2013 | Mohan | G05B 15/02 700/297 |
| 2013/0297073 A1* | 11/2013 | Elwell | H05B 47/175 700/275 |
| 2014/0072211 A1* | 3/2014 | Kovesi | H04N 5/23229 382/164 |
| 2014/0125150 A1* | 5/2014 | Alberth, Jr. | G05B 15/02 307/126 |
| 2015/0022091 A1* | 1/2015 | Deixler | H05B 47/10 315/149 |
| 2016/0212506 A1* | 7/2016 | Norwood | H04Q 9/00 |
| 2016/0216721 A1* | 7/2016 | Michalski | F24F 11/30 |
| 2017/0223811 A1* | 8/2017 | Vangeel | H02J 13/0075 |

FOREIGN PATENT DOCUMENTS

| | | |
|---|---|---|
| CN | 102361496 | 2/2012 |
| CN | 202178833 U | 3/2012 |
| CN | 104865833 | 8/2015 |
| CN | 105357832 | 2/2016 |
| CN | 105676809 A | 6/2016 |
| CN | 106325086 | 1/2017 |
| CN | 106483884 | 3/2017 |
| JP | 2003120987 | 4/2003 |
| WO | 20016/050707 A1 | 4/2016 |

OTHER PUBLICATIONS

Extended European search report for Application No. 17861657.9, dated Jan. 27, 2020, pp. 1-6, European Patent Office, Germany.
Examination Report in Australian Patent Application No. 2017345958, dated Jul. 21, 2020, 5 pages.

* cited by examiner

POWER CONSUMPTION MANAGEMENT METHOD FOR ELECTRIC DEVICES, MANAGER AND MANAGEMENT SYSTEM

TECHNICAL FIELD

This application is a 371 of International Patent Application No. PCT/CN2017/080867, filed Apr. 18, 2017, which claims priority to the Chinese Patent Application No. CN201610917629.1, filed with the Chinese Patent Office on Oct. 21, 2016, and entitled "POWER CONSUMPTION MANAGEMENT METHOD FOR ELECTRIC EQUIPMENT, MANAGEMENT DEVICE, AND MANAGEMENT SYSTEM", both of which are incorporated herein by reference in their entirety.

BACKGROUND

At present, power distribution for various electric devices in a family is controlled manually. A state of a power switch of each electric device is controlled manually by a user for operation. When some electric device needs to be powered on, a power switch is turned on manually. When some electric device needs to be powered off, a power switch is turned off manually.

The device is controlled manually by the user to be powered on and powered off in daily life. Due to negligence of the user, a condition in which an electric device is forgotten to be powered off is occurred frequently, and thus the energy waste is caused.

SUMMARY

In view of this, the embodiments of the present invention provide a power consumption management method for electric devices, a manager and a management system to solve the problem of energy waste due to the fact that a user forgets to turn off an electric device when leaving.

To this end, the following technical solutions are provided by the embodiments of the present invention.

A power consumption management method for electric devices may include the following steps.

Identification information of an electric device in a power-on state in a monitoring area is acquired.

Information of the monitoring area is collected, and whether a user exists in the monitoring area or not is judged according to a collection result; when the user does not exist in the monitoring area, a type set to which the identification information belongs is judged; when determining that the identification information is included in a first type set, the electric device is powered off; and when determining that the identification information is included in a second type set, timekeeping is begun, and when a timekeeping duration reaches to a preset duration matched with the identification information, the electric device is powered off.

Preferably, in the power consumption management method for the electric devices, the step that information of the monitoring area is collected, and whether a user exists in the monitoring area or not is determined according to the collection result may include the following step.

An image of the monitoring area is collected, image information processing is performed on collected image information, and whether the user exists in the monitoring area or not is judged according to a processing result.

Preferably, in the power consumption management method for the electric devices, the step that information of the monitoring area is collected, and whether a user exists in the monitoring area or not is judged according to the collection result may include the following step.

Data of a target area are collected by using a sensor, and whether the user exists in the monitoring area or not is determined according to an output signal of the sensor.

Preferably, the power consumption management method for the electric devices further may include the following steps.

Power consumption data information of the electric device in the power-on state in the monitoring area is acquired, where the power consumption data information may at least include a working current of the electric device, a working voltage of the electric device and a power of the electric device.

According to the power consumption data information, whether the electric device works in an abnormal state or not is determined, and when the electric device works in an abnormal state, the electric device is powered off.

Preferably, the power consumption management method for the electric devices further may include the following steps.

When determining that the user exists in the monitoring area, whether the acquired identification information of the electric device in the power-on state includes preset identification information or not is determined; when the acquired identification information of the electric device in the power-on state does not comprise preset identification information, a current time point is acquired, and whether the current time point is included in a power-on time interval matched with the preset identification information or not is determined; and when the current time point is included in the power-on time interval, an electric device matched with the preset identification information is controlled to be powered on automatically.

A power consumption manager for electric devices may include an identification information collection unit, a monitoring unit and an analysis unit.

The identification information collection unit is configured to acquire identification information of an electric device in a power-on state in a monitoring area.

The monitoring unit is configured to acquire monitoring data of the monitoring area, determine whether a user exists in the monitoring area or not according to the monitoring data, and when the user exists in the monitoring area, output a first trigger signal to the analysis unit.

The analysis unit is configured to determine, when the first trigger signal is acquired, a type set to which the identification information collected by the identification information collection unit belongs; output, when determining that the identification information is included in a first type set, a control signal used for controlling the electric device to power off; and begin, when determining that the identification information is included in a second type set, timekeeping, and output, when a timekeeping duration reaches a preset duration matched with the identification information, the control signal used for controlling the electric device to power off.

Preferably, in the power consumption manager for the electric devices, the monitoring unit may include an image analysis unit.

The image analysis unit is configured to acquire a monitoring image of the monitoring area, perform image information processing on the monitoring image, and determining whether the user exists in the monitoring image or not according to a processing result.

Preferably, in the power consumption manager for the electric devices, the monitoring unit may include a judgment unit.

The judgment unit is configured to acquire a sensor signal used for monitoring the monitoring area and output by a sensor, and determine whether the user exists in the monitoring area or not according to the sensor signal.

Preferably, the power consumption manager for the electric devices may further include a working condition data collection unit, and a fault analysis unit.

The working condition data collection unit is configured to acquire power consumption data information of the electric device in the power-on state in the monitoring area, where the power consumption data information may at least include a working current of the electric device, a working voltage of the electric device and a power of the electric device.

The fault analysis unit is configured to determine, according to the power consumption data information, whether the electric device works in an abnormal state or not, and when the electric device works in an abnormal state, power off the electric device.

Preferably, in the power consumption manager for the electric devices, the monitoring unit is further configured to output, when determining that the user exists in the monitoring area, a second trigger signal to the analysis unit.

The analysis unit is configured to determine, when the second trigger signal is acquired, whether the acquired identification information of the electric device in the power-on state includes preset identification information or not; acquire, when the acquired identification information of the electric device in the power-on state does not comprise preset identification information, a current time point, and determine whether the current time point is included in a power-on time interval matched with the preset identification information or not; and control, when the current time point is included in the power-on time interval, an electric device matched with the preset identification information to be powered on automatically.

A power consumption management system for electric devices may include: the power consumption manager for the electric devices described in any of the above embodiments, a monitoring device, and state manager.

The monitoring device is configured to monitor a monitoring area, and output monitoring data to the power consumption manager for the electric devices.

The state manager is configured to acquire power consumption data information of the electric devices, and control power supply states of the electric devices according to at least one user operation or at least one control signal output by the power consumption manager for the electric devices.

Preferably, the power consumption management system for the electric devices may include the followings.

When an electric device is an electric device without an internet control function, a state manager is an intelligent adapter plug.

When an electric device is an electric device with the internet control function, a state manager is a controller configured inside the electric device.

Preferably, the power consumption management system for the electric devices may further include a parameter configuration device.

The parameter configuration device is configured to configure identification information of the electric devices, a type set to which each piece of the identification information belongs, a preset duration matched with each piece of the identification information included in a second type set, each power consumption data information when each electric device works normally, and a power-on interval matched with preset identification information.

Preferably, the power consumption management system for the electric devices may further include a cloud server.

The cloud server is connected with the parameter configuration device, and the power consumption manager for the electric devices, and is configured to store data information, which is provided for the power consumption manager for the electric devices, configured by the parameter configuration device.

Preferably, in the power consumption management system for the electric devices, the monitoring device may include at least one of a sensor and an image collection device.

Based on the above technical solutions, i.e., the above solutions provided by the embodiments of the present invention, by acquiring the identification information of the electric device in the power-on state in the monitoring area, when the user leaves the monitoring area, according to the type set to which the identification information belongs and the preset duration matched with the identification information, the electric device is automatically controlled to be powered off, and thus the energy waste due to the fact that the user forgets to turn off an electric device when leaving the monitoring area is prevented.

BRIEF DESCRIPTION OF THE DRAWINGS

In order to describe the technical solutions in the embodiments or in the conventional art of the present invention more clearly, the drawings required to be used in descriptions about the embodiments will be simply introduced below. Obviously, the drawings in the following descriptions are only some embodiments of the present invention. Those of ordinary skilled in the art may further obtain other drawings according to these drawings without creative work.

DETAILED DESCRIPTION OF THE EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
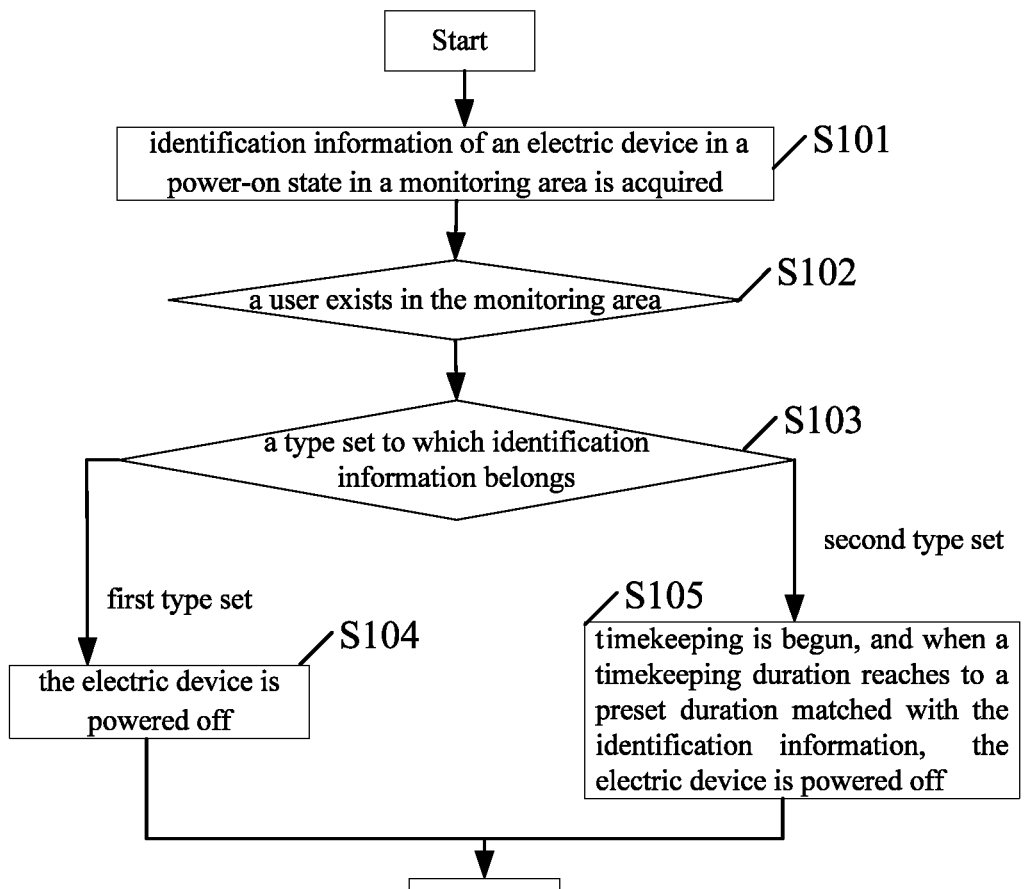
FIG. 1 shows a flowchart schematic diagram of a power consumption management method for electric devices disclosed by an embodiment of the present invention.

In order to implement automatic power-off control for electric devices, the present invention discloses a power consumption management method for the electric devices. Referring to FIG. 1, the method may include the following steps.

At Step S101: identification information of an electric device in a power-on state in a monitoring area is acquired.

In the technical solutions disclosed by this embodiment of the present invention, a plurality of monitoring areas may be provided, and a plurality of electric devices are arranged in each of the monitoring areas. For each of the electric devices, a user may provide, in advance, identification information that is matched with the electric device and is unique. When an electric device in each of the monitoring areas is powered on, identification information of the electric device in a power-on state is acquired.

At Step S102: whether a user exists in the monitoring area or not is determined, and when the user exists in the monitoring area, the step S103 is executed.

Herein, it is to be noted that the user may refer to a person. In this step, information of the monitoring area is collected, and whether the user exists in the monitoring area or not is determined according to collected data information. Specifically, a plurality of technical solutions are provided to determine whether the person exists in an area in the conventional art, and thus any solution may be selected by the present invention to take as a specific implementation solution in this step.

At Step S103: a type set to which the identification information belongs is determined; when it is determined that the identification information is included in a first type set, the step S104 is executed; and when determining that the identification information is included in a second type set, the step S105 is executed.

In this step, identification information corresponding to the electric devices may be divided by the user into a plurality of type sets in advance according to device types of the electric devices. For example, the type sets may include a first type set, a second type set, a third type set and the like. An electric device corresponding to identification information in the first type set is an instantaneous electric device. The instantaneous electric device refers to an electric device that should be powered off immediately when the user leaves away from the monitoring area. For example, the instantaneous electric device may include a lamp, a fan and the like. An electric device corresponding to identification information in the second type set is a short-time electric device. The short-time electric device refers to an electric device that should be powered off when the user leaves away from the monitoring area for a period of time. For example, the short-time electric device may include an electric cooker, a thermal jug, a television, an air conditioner, a smoke exhaust ventilator and the like. An electric device corresponding to identification information in the third type set is a long-term electric device. The long-time electric device refers to an electric device that should be powered on for a long time. For example, the long-time electric device may include a refrigerator and the like. When it is determined that the identification information is included in the third type set, a working state of the electric device may not be changed.

At Step S104: the electric device is powered off.

In this step, for example, when the user leaves away from the monitoring area under a condition in which a lighting installation is not turned off, the lighting installation should be powered off directly.

At Step S105: timekeeping is begun, and when a timekeeping duration reaches a preset duration matched with the identification information, the electric device is powered off.

In this step, the user may provide a preset duration for each short-time electric device in advance. The preset duration is a duration of a continuous working time of the electric device after the user leaves. For example, when the short-time electric device is the television, the preset duration may be set as 10 min, i.e., when the user leaves away from the monitoring area under a condition in which the television is not turned off, the timekeeping is begun, and when the timekeeping duration reaches 10 min, the television is controlled to be powered off. Certainly, considering that the user may leave temporarily, in the above solution, within a time period from the time when the timekeeping is started to the time when the timekeeping duration reaches to the preset duration, if it is monitored that the user enters the monitoring area again, the timekeeping is cleared and is stopped. At this moment, a power supply condition of each electric device may be controlled manually by the user.

From the technical solutions disclosed by the above embodiment of the present invention, it may be seen that, by acquiring the identification information of the electric device in the power-on state in the monitoring area, when the user leaves the monitoring area, according to the type set to which the identification information belongs and the preset duration matched with the identification information, the electric device is automatically controlled to be powered off, and thus the energy waste due to the fact that the user forgets to turn off an electric device when leaving the monitoring area is prevented.

In the technical solutions disclosed by the above embodiment of the present invention, when whether the user exists in the monitoring area or not is determined, there is a need to collect monitoring information used for monitoring the monitoring area and output by the monitoring device. Herein, a device type of the monitoring device may be determined independently according to a user demand, and for example, the monitoring device may be an image collection device or a sensor, etc. When the monitoring device is the image collection device, the step S102 specifically may be as follows: an image of the monitoring area is collected, image information processing is performed on collected image information, characteristics of the image information are captured, and whether the user exists in the monitoring area is determined according to a capture result. When the monitoring device is the sensor, the step S102 specifically may be as follows: a sensor signal output by the sensor is acquired, and whether the user exists in the monitoring area is determined according to the sensor signal.

Figure 2:
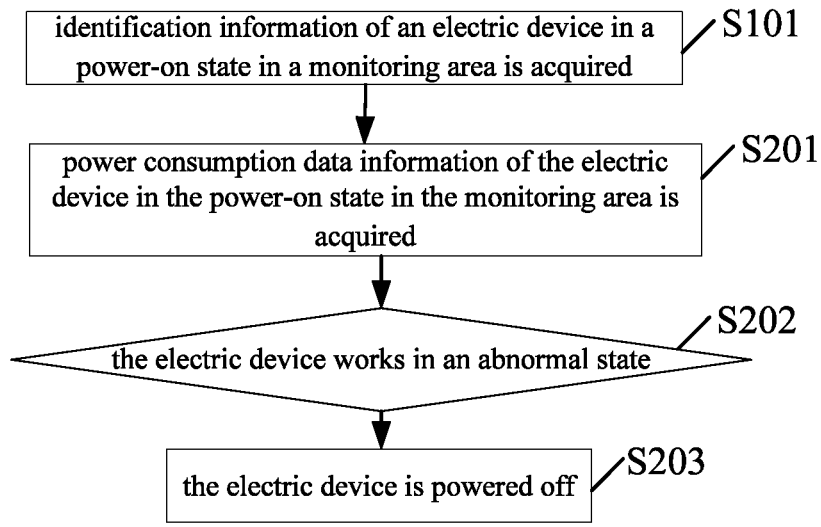
FIG. 2 shows a flowchart schematic diagram of a power consumption management method for electric devices disclosed by another embodiment of the present invention.

In order to prevent that when an electric device breaks down, the electric device is still powered continuously and thus the electric device is damaged, referring to FIG. 2, in the technical solutions disclosed by the above embodiment of the present invention, the method may further include the following steps.

At Step S201: power consumption data information of the electric device in the power-on state in the monitoring area is acquired.

Data parameters included in the power consumption data information may be set at discretion according to the user demand. For example, the data parameters included in the power consumption data information may at least include a working current, a working voltage and a power of the electric device.

At Step S202: whether the electric device works in an abnormal state or not is determined, and when the electric device works in the abnormal state, the step S203 is executed.

In this step, by comparing current power consumption data information of the electric device with power consumption data information when the electric device works normally, whether the electric device is in the abnormal state or not is determined according to a comparison result.

At Step S203: the electric device is powered off.

In this step, when it is detected that the electric device is in the abnormal state, the electric device is powered off. Certainly, in order to remind the user so that the user repairs the electric device conveniently and timely, in this step, while the electric device is powered off, an alarm signal matched with the electric device may further be output. Moreover, in order to facilitate the user to search a fault cause, power consumption data information of the electric device when a fault is occurred may also be displayed to the user via a display device. At this moment, data causing the fault may be labeled.

Figure 3:
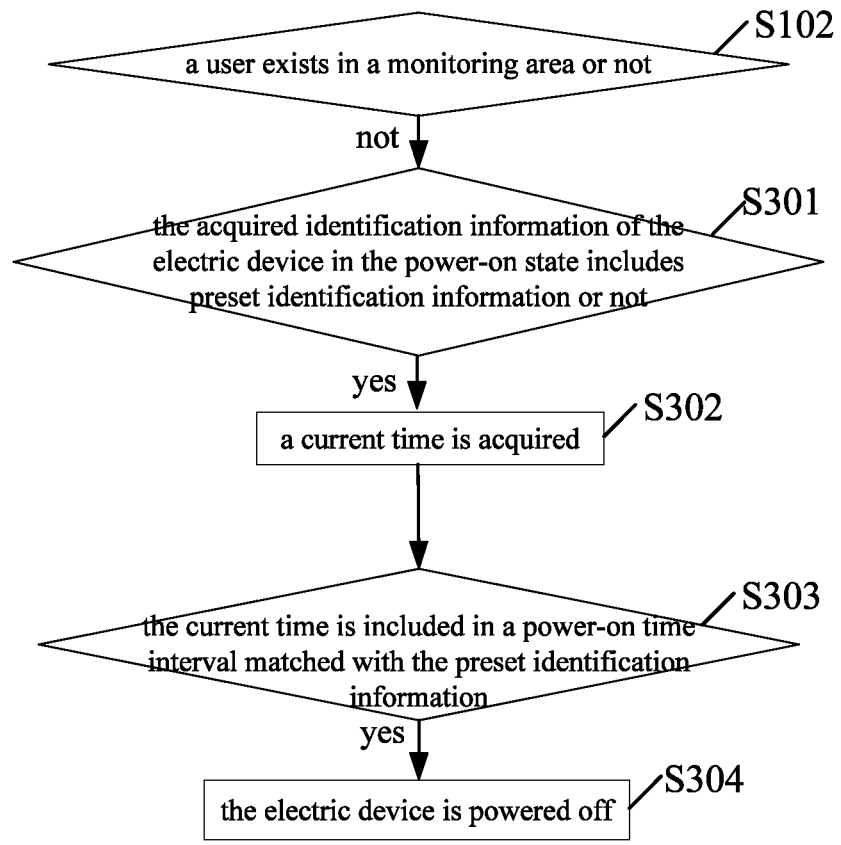
FIG. 3 shows a flowchart schematic diagram of a power consumption management method for electric devices disclosed by a still another embodiment of the present invention.

In some times, in order to facilitate the user, when the user enters the monitoring area, some electric devices may be controlled to be powered on automatically. For example, when the user enters a room in hot summer, the air conditioner is powered on automatically, and when the user goes to the toilet in nighttime, the lighting installation of the toilet is powered on automatically. In view of this, some preset devices may be set by the user in advance, and these preset devices are devices that need to be powered on automatically when the user enters the monitoring area. Referring to FIG. 3, in the method disclosed by the above embodiment of the present invention, in the step S102, when it is determined that the user exists in the monitoring area, the step S301 is executed.

At Step S301: whether the acquired identification information of the electric device in the power-on state includes preset identification information or not is determined, and when the acquired identification information of the electric device in the power-on state does not comprise preset identification information, the step S302 is executed.

In this step, the preset identification information is identification information corresponding to the above preset devices.

At Step S302: a current time point is acquired, and the step S303 is executed.

When the device corresponding to the preset identification information is the air conditioner, it is general that the air conditioner is only powered on in summer and in winter, and does not need to be powered on in other time periods. When the device corresponding to the preset identification information is the lighting installation, it is general that the lighting installation is only powered on in nighttime and does not need to be powered on in other time periods. Therefore, in order to determine whether the preset device needs to be powered on or not at this moment, a current moment is collected necessarily.

At Step S303: whether the current time point is included in a power-on time interval matched with the preset identification information or not is determined, and when the current time point is included in the power-on time interval, the step S304 is executed.

In this step, according to a specific demand of each of the preset devices, the user may provide a power-on time interval of the preset device so that the preset device is powered on automatically. For example, when the preset device is the lighting installation, a power-on time interval is six o'clock in night to six o'clock in morning. Certainly, the power-on time interval of the lighting installation has different ranges in different seasons. For example, in summer, the power-on time interval may be eight o'clock in night to the six o'clock in morning. In winter, the power-on time interval may be six o'clock in night to six o'clock in morning, and the like. For a condition in which a preset electric device is provided with a plurality of power-on time intervals, before this step is executed, the method may further include a step that a power-on time interval matched with the current time point is selected as a power-on time interval matched with the preset device.

At Step S304: an electric device matched with the preset identification information is controlled to be powered on automatically.

With the technical solutions disclosed by the above embodiment of the present invention, an activity condition of a human body in the monitoring area may be monitored in real time, and a power consumption condition of each of the electric devices may be controlled better and reasonably. For some energy wastes, a condition in which the energy utilization is unreasonable is managed is managed, and the energy is saved to the largest extent. Moreover, with the utilization of an intelligent adapter plug, not only can the utilization of an original household electrical appliance be improved, but the cost of the system used by the user is also reduced. Certainly, the method is applied to management of the electric devices not only in a family, but also in an enterprise, a plant and the like, so that the energy may be saved to a large extent and the cost is saved.

Figure 4:
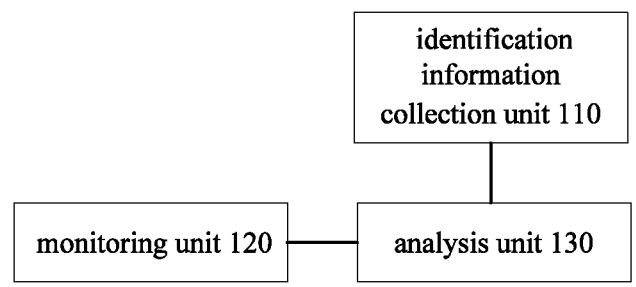
FIG. 4 shows a structural schematic diagram of a power consumption manager for electric devices disclosed by an embodiment of the present invention.

Corresponding to the above method, the present invention further discloses a power consumption manager for electric devices using the method disclosed in the above embodiment of the present invention. The method and a real-time solution of the manager for the electric devices may be used for reference to one another. Referring to FIG. 4, the power consumption manager for the electric devices may include an identification information collection unit 110, a monitoring unit 120 and an analysis unit 130.

The identification information collection unit 110 is configured to acquire identification information of an electric device in a power-on state in a monitoring area.

The monitoring unit 120 is configured to acquire monitoring data of the monitoring area, determine whether a user exists in the monitoring area or not according to the monitoring data, and when the user exists in the monitoring area, output a first trigger signal to the analysis unit.

The analysis unit 130 is configured to determine, when the first trigger signal is acquired, a type set to which the identification information collected by the identification information collection unit belongs; output, when determining that the identification information is included in a first type set, a control signal used for controlling the electric device to power off; and begin, when determining that the identification information is included in a second type set, timekeeping, and output, when a time-keeping duration reaches a preset duration matched with the identification information, the control signal used for controlling the electric device to power off.

Corresponding to the above-mentioned method, the analysis unit 130 may further be configured to clear and stop the timekeeping if it is monitored that the user enters the monitoring area again in a time period from the time when the timekeeping is begun to the time that the timekeeping duration reaches to the preset duration, so that a power supply condition of each of the electric devices is controlled manually by the user.

Corresponding to the above-mentioned method, the monitoring unit 120 may include an image analysis unit, configured to acquire a monitoring image, collected by the image collection device, of the monitoring area, capture characteristics of the image information, and determining whether the user exists in the monitoring area or not according to a capture result.

Corresponding to the above-mentioned method, the monitoring unit 120 may further include a judgment unit, configured to acquire a sensor signal used for monitoring the monitoring area and output by a sensor, and determining whether the user exists in the monitoring area or not according to the sensor signal.

Corresponding to the above-mentioned method, in order to stop the power supply to the electric device timely when the electric device breaks down, the manager may further be provided with a working condition data collection unit, and a fault analysis unit. The working condition data collection unit is configured to acquire power consumption data information of the electric device in the power-on state in the monitoring area, where the power consumption data information at least includes a working current, a working voltage and a power of the electric device. The fault analysis unit is configured to determine, according to the power consumption data information, whether the electric device works in an abnormal state or not (for example, by comparing current power consumption data information of the electric device with power consumption data information when the electric device works normally, whether the electric device is in the abnormal state or not is determined according to a comparison result), and when the electric device is in the abnormal state, power off the electric device.

Corresponding to the above-mentioned method, the manager may further include an alarm signal generation unit, configured to generate and output, when it is determined that the electric device works abnormally, an alarm signal matched with the electric device, output power consumption data information of the electric device to a display device simultaneously, and label data causing the fault.

Corresponding to the above-mentioned method, when the user enters the monitoring area, in order to automatically implement power-on control and management of each of the preset devices, the monitoring unit 110 is further configured to output, when it is determined that the user exists in the monitoring area, a second trigger signal to the analysis unit.

The analysis unit 130 is further configured to determine, when the second trigger signal is acquired, whether the acquired identification information of the electric device in the power-on state includes preset identification information or not; acquire, when the acquired identification information of the electric device in the power-on state does not comprise preset identification information, a current time point, and determine whether the current time point is included in a power-on time interval matched with the preset identification information or not; and control, when the current time point is included in the power-on time interval, an electric device matched with the preset identification information to be powered on automatically.

Corresponding to the above-mentioned method, when the preset device is provided with a plurality of power-on time intervals, the analysis unit 130 is further provided with a selection unit, configured to select a power-on time interval matched with the current time point as a power-on time interval matched with the preset device.

Figure 5:
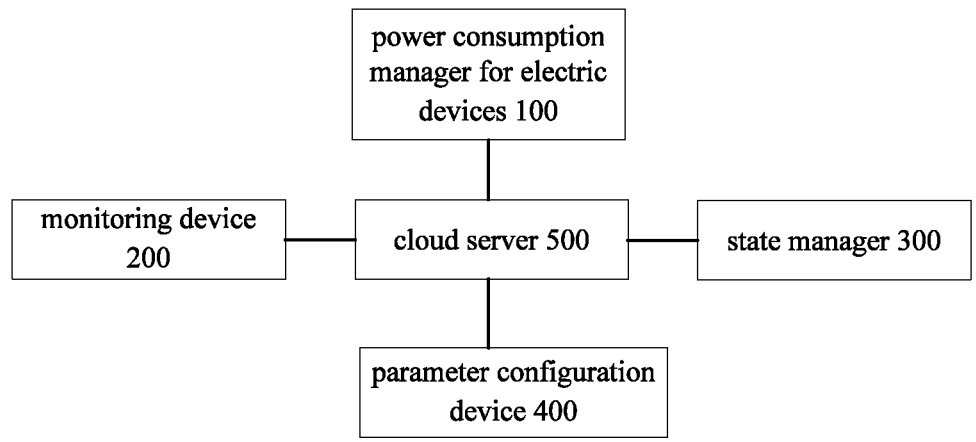
FIG. 5 shows a structural schematic diagram of a power consumption management system for electric devices disclosed by an embodiment of the present invention.

Corresponding to the above-mentioned power consumption manager for the electric devices, the present invention further discloses a power consumption management system for the electric devices. Referring to FIG. 5, the system may include: the power consumption manager for the electric devices 100 disclosed in any embodiment of the present invention, a monitoring device 200 and state manager 300.

The monitoring device 200 is connected with the power consumption manager for the electric devices, and is configured to monitor a monitoring area, and output monitoring data to the power consumption manager for the electric devices.

The state manager 300 are configured to acquire power consumption data information and identification information of the electric devices, send collected power consumption data information and identification information to the power consumption manager for the electric devices 100, and control power supply states of the electric devices according to at least one user operation or at least one output by the power consumption manager for the electric devices 100.

In this system, each electric device is corresponding to one state manager 300. A state manager 300 may store identification information of a corresponding electric device.

When an electric device is an electric device without an internet control function, a state manager is an intelligent adapter plug. When an electric device is an electric device with the internet control function, a state manager is a controller configured inside the electric device.

In order that the user conveniently sets various parameters used in the above embodiment and configures identification information of each electric device, and each type set, power-on time interval and preset duration, etc., referring to FIG. 5, the system in the above solution may further include a parameter configuration device 400, configured to configure various parameters such as identification information of the electric devices, preset identification information, a type set to which each piece of the identification information belongs, a preset duration matched with each piece of the identification information included in a second type set, power consumption data information when each electric device works normally, a power-on interval matched with the preset identification information, and power consumption data parameters when each electric device works normally.

The parameter configuration device 400 may be a touch screen device. The user may further invoke and display the power consumption data information of each electric device via the parameter configuration device.

In order to manage the various parameters that are set above, referring to FIG. 5, the system may further include a cloud server 500.

The cloud server 500 is connected with the parameter configuration device 400 and the power consumption manager for the electric devices 100, and is configured to store data information, which is provided for the power consumption manager for the electric devices 100, configured by the parameter configuration device 400.

In the technical solutions disclosed by the above embodiment of the present invention, in order to store historical data conveniently, each parameter may be sent to the cloud server 500 in advance. The cloud server 500 stores the data and then sends the data to the power consumption manager for the electric devices 100.

In the above solutions, the monitoring device 200 may include at least one of a sensor and an image collection device. The sensor may be a wireless sensor. A wireless sensor network is formed and is used via the wireless sensor. By enabling the wireless sensor network to monitor and analyze the monitoring area, necessary parameters are provided for a whole power distribution management system.

For the convenience of description, when the above system is described, the system is divided into various modules in terms of functions so as to describe respectively. Certainly, when the present invention is implemented, the functions of the modules may be combined to a same or multiple software and/or hardware units for implementation.

The embodiments of the present invention are described in a progressive way, the same or similar contents of the embodiments may be referred to each other, and each embodiment emphasizes the differences from other embodiments. Particularly, for a system or a system embodiment, since it is substantially similar to a method embodiment, the description of the system is brief, and for relevant matters, references may be made to the description of the method embodiment. The above-described system and system embodiment are only schematic. The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement. Those of ordinary skill in the art may understand and implement in a condition without creative work.

Those skilled in the art may realize that the units and algorithm steps of each example described in combination with the embodiments disclosed in the present invention may be implemented by electronic hardware or a combination of computer software and the electronic hardware. In order to clearly illustrate the interchangeability of the hardware and the software, the compositions and steps of each example are described above generally according to functions. Whether these functions are executed in a hardware or software manner depends on specific applications and design constraints of the technical solutions. Those skilled in the art may realize the described functions for each specific application by virtue of different methods, but such realization shall fall within the scope of the present invention.

Steps of the method or the algorithm described in combination with the embodiments disclosed herein may be directly implemented by using hardware, a processor executing software module or a combination of both. The software module may be placed in a Random-Access Memory (RAM), a memory, a Read-Only Memory (ROM), an electrically programmable ROM, an electrically erasable programmable ROM, a register, a hard disk, a removable disk, a CD-ROM, or a storage medium in any known other forms in the technical field.

It further should be noted that, the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless exclusively limited otherwise, the statement "comprising (including) one . . . " does not exclude the case that other similar elements may exist in the process, method, article or device.

The above description on the disclosed embodiments can enable a person skilled in the art to implement or use the present invention. Various modifications to these embodiments are obvious for the person skilled in the art. General principles defined herein may be implemented in other embodiments without departing from the spirit or scope of the present invention. Therefore, the present invention is not limited to these embodiments herein, but complies with a widest range consistent with the principle and novel characteristics disclosed herein.

What is claimed is:

1. A power consumption management method for electric devices, comprising:
   acquiring identification information of an electric device in a power-on state in a monitoring area; and
   collecting information of the monitoring area, and determining whether a user exists in the monitoring area or not according to a collection result; when the user does not exist in the monitoring area, determining a type set to which the identification information belongs; when determining that the identification information is identification information of a first type set, powering off the electric device; and when determining that the identification information is identification information of a second type set, beginning timekeeping, and when a timekeeping duration reaches to a preset duration matched with the identification information, powering off the electric device;
   the identification information is the identification information of the first type set, the identification information of the second type set, or identification information of a third type set, the identification information of the first type set is information that characterizes the electric device as an instantaneous electric device, the instantaneous electric device refers to the electric device that should be powered off when the user leaves away from the monitoring area for a first period of time, the identification information of the second type set is information that characterizes the electric device as a short-time electric device, the short-time electric device refers to the electric device that should be powered off when the user leaves away from the monitoring area for a second period of time; the identification information of the third type set is information that characterizes the electric device as a long-term electric device, the long-time electric device refers to the electric device that should be powered on for a third period of time;
   the first period of time is less than the second period of time, the second period of time is less than the third period of time.

2. The power consumption management method for the electric devices as claimed in claim 1, wherein collecting the information of the monitoring area, and determining whether the user exists in the monitoring area or not according to the collection result comprises:
   collecting image information of the monitoring area, performing image information processing on the image information, and determining whether the user exists in the monitoring area or not according to a processing result.

3. The power consumption management method for the electric devices as claimed in claim 1, wherein collecting the information of the monitoring area, and determining whether the user exists in the monitoring area or not according to the collection result comprises:
   obtaining data of the monitoring area collected by a sensor, and determining whether the user exists in the monitoring area or not according to an output signal of the sensor.

4. The power consumption management method for the electric devices as claimed in claim 1, further comprising:

acquiring power consumption data information of the electric device in the power-on state in the monitoring area, wherein the power consumption data information at least comprises a working current of the electric device, a working voltage of the electric device and a power of the electric device; and determining whether the electric device works in an abnormal state or not according to the power consumption data information, and when the electric device works in the abnormal state, powering off the electric device.

5. The power consumption management method for the electric devices as claimed in claim 1, further comprising:

when determining that the user exists in the monitoring area, determining whether the acquired identification information of the electric device in the power-on state comprises preset identification information or not; when the acquired identification information of the electric device in the power-on state does not comprise preset identification information, acquiring a current time point, and determining whether the current time point is comprised in a power-on time interval matched with the preset identification information or not; and when the current time point is comprised in the power-on time interval, controlling an electric device matched with the preset identification information to be powered on automatically.

6. A power consumption manager for electric devices, comprising:

an identification information collection unit, configured to acquire identification information of an electric device in a power-on state in a monitoring area;

a monitoring unit, configured to acquire monitoring data of the monitoring area, determine whether a user exists in the monitoring area or not according to the monitoring data, and when the user exists in the monitoring area, output a first trigger signal to the analysis unit; and an analysis unit, configured to determine, when the first trigger signal is acquired, a type set to which the identification information collected by the identification information collection unit belongs; output, when determining that the identification information is identification information of a first type set, a control signal used for controlling the electric device to power off; and begin, when determining that the identification information is identification information of a second type set, timekeeping, and output, when a timekeeping duration reaches a preset duration matched with the identification information, the control signal used for controlling the electric device to power off, the identification information is the identification information of the first type set, the identification information of the second type set, or identification information of a third type set, the identification information of the first type set is information that characterizes the electric device as an instantaneous electric device, the instantaneous electric device refers to the electric device that should be powered off when the user leaves away from the monitoring area for a first period of time, the identification information of the second type set is information that characterizes the electric device as a short-time electric device, the short-time electric device refers to the electric device that should be powered off when the user leaves away from the monitoring area for a second period of time; the identification information of the third type set is information that characterizes the electric device as a long-term electric device, the long-time electric device refers to the electric device that should be powered on for a third period of time, the first period of time is less than the second period of time, the second period of time is less than the third period of time.

7. The power consumption manager for the electric devices as claimed in claim 6, wherein the monitoring unit comprises:

an image analysis unit, configured to acquire a monitoring image of the monitoring area, perform image information processing on the monitoring image, and determining whether the user exists in the monitoring image or not according to a processing result.

8. The power consumption manager for the electric devices as claimed in claim 6, wherein the monitoring unit comprises:

a judgment unit, configured to acquire a sensor signal used for monitoring the monitoring area and output by a sensor, and determining whether the user exists in the monitoring area or not according to the sensor signal.

9. The power consumption manager for the electric devices as claimed in claim 6, further comprising:

a working condition data collection unit, configured to acquire power consumption data information of the electric device in the power-on state in the monitoring area, wherein the power consumption data information at least comprises a working current of the electric device, a working voltage of the electric device and a power of the electric device; and a fault analysis unit, configured to determine, according to the power consumption data information, whether the electric device works in an abnormal state or not, and when the electric device works in an abnormal state, power off the electric device.

10. The power consumption manager for the electric devices as claimed in claim 6, wherein the monitoring unit is further configured to output, when determining that the user exists in the monitoring area, a second trigger signal to the analysis unit; and the analysis unit is configured to determine, when the second trigger signal is acquired, whether the acquired identification information of the electric device in the power-on state comprises preset identification information or not; when the acquired identification information of the electric device in the power-on state does not comprise preset identification information, acquire a current time point, and determine whether the current time point is comprised in a power-on time interval matched with the preset identification information or not; and control, when the current time point is comprised in the power-on time interval, an electric device matched with the preset identification information to be powered on automatically.

11. A power consumption management system for electric devices, comprising:

the power consumption manager for the electric devices as claimed in claim 6;

a monitoring device, configured to monitor a monitoring area, and output monitoring data to the power consumption manager for the electric devices; and state manager, configured to acquire power consumption data information of each of the electric devices, and control power supply states of the electric devices according to at least one user operation or at least one control signal output by the power consumption manager for the electric devices.

12. The power consumption management system for the electric devices as claimed in claim 11, wherein
when an electric device is an electric device without an internet control function, a state manager is an intelligent adapter plug; and
when an electric device is an electric device with the internet control function, a state manager is a controller configured inside the electric device.

13. The power consumption management system for the electric devices as claimed in claim 11, further comprising:
a parameter configuration device, configured to configure identification information of the electric devices, a type set to which each piece of the identification information belongs, a preset duration matched with each piece of the identification information comprised in a second type set, each power consumption data information when each electric device works normally, and a power-on interval matched with preset identification information.

14. The power consumption management system for the electric devices as claimed in claim 13, further comprising:
a cloud server, connected with the parameter configuration device, and the power consumption manager for the electric devices, and configured to store data information, which is provided for the power consumption manager for the electric devices, configured by the parameter configuration device.

15. The power consumption management system for the electric devices as claimed in claim 11, wherein the monitoring device comprises at least one of a sensor and an image collection device.

* * * * *